(12) United States Patent
Springsklee et al.

(10) Patent No.: US 10,883,293 B2
(45) Date of Patent: Jan. 5, 2021

(54) HINGE ASSEMBLY

(71) Applicant: Bayerische Motoren Werke Aktiengesellschaft, Munich (DE)

(72) Inventors: Markus Springsklee, Munich (DE); Haci Korkusuz Janket, Munich (DE); Felix Hatz, Munich (DE); Walter Meierhofer, Schmidham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/271,997

(22) Filed: Feb. 11, 2019

(65) Prior Publication Data

US 2019/0168705 A1    Jun. 6, 2019

Related U.S. Application Data

(63) Continuation of application No. PCT/EP2017/070869, filed on Aug. 17, 2017.

(30) Foreign Application Priority Data

Aug. 17, 2016   (DE) .......................... 10 2016 215 377

(51) Int. Cl.
*E05D 3/14*      (2006.01)
*E05D 11/00*    (2006.01)
(Continued)

(52) U.S. Cl.
CPC .............. *E05D 3/145* (2013.01); *B60R 21/38* (2013.01); *E05D 3/147* (2013.01); *E05D 11/00* (2013.01);
(Continued)

(58) Field of Classification Search
CPC ......... E05D 3/145; E05D 3/147; E05D 11/00; E05D 11/10; B60R 21/38
See application file for complete search history.

(56) References Cited

U.S. PATENT DOCUMENTS 8,544,590 B2 * 10/2013 McIntyre ................ B60R 21/38
                                                           180/274
8,893,354 B2 * 11/2014 McIntyre, I ............ B60R 21/38
                                                           16/288
(Continued)

FOREIGN PATENT DOCUMENTS

CN      102434051 A     5/2012
CN      102582567 A     7/2012
(Continued)

OTHER PUBLICATIONS

International Search Report (PCT/ISA/210) issued in PCT Application No. PCT/EP2017/070869 dated Oct. 30, 2017 with English translation (six (6) pages).

(Continued)

*Primary Examiner* — Jeffrey O'Brien
(74) *Attorney, Agent, or Firm* — Crowell & Moring LLP

(57) ABSTRACT

A hinge assembly for securing a flap to a vehicle body includes a first hinge part which can be moved between a closed position and an open position for securing to a vehicle body, a second hinge part which can be moved between a closed position and an open position for securing the flap to be mounted relative to the vehicle body, and a deployment securing device for locking the second hinge part relative to the first hinge part. The deployment securing device has a first securing part which is paired with the first hinge part, a second securing part which is paired with the second hinge part, and a locking element and is configured such that the locking element is coupled to the first securing part in the closed position and is locked by the second securing part in a first locking position. The second securing part unlocks the locking element in the course of the movement of the second securing part from the closed position into the open position and thereby releases the locking element. The deployment securing device is configured such that after the locking (Continued)

element is unlocked in the first locking position, the locking element is moved into a second locking position in which the locking element produces a coupling between the first securing part and a third securing part paired with the first hinge part and locks the first securing part and the third securing part in the open position.

9 Claims, 3 Drawing Sheets

(51) Int. Cl.
    *B60R 21/38*     (2011.01)
    *E05D 11/10*     (2006.01)

(52) U.S. Cl.
    CPC ........ *E05D 11/10* (2013.01); *E05D 2011/009* (2013.01); *E05Y 2900/536* (2013.01)

(56) References Cited

U.S. PATENT DOCUMENTS

| | | | |
|---|---|---|---|
| 9,783,154 B2* | 10/2017 | Kim | B60R 21/34 |
| 10,100,565 B2* | 10/2018 | Waskie | E05D 3/145 |
| 10,239,484 B2* | 3/2019 | Hwang | E05D 3/125 |
| 10,315,613 B2* | 6/2019 | Patterson | E05D 3/06 |
| 10,369,959 B2* | 8/2019 | McLundie | B60R 21/38 |
| 2007/0062747 A1* | 3/2007 | Erwin | B60R 21/38 |
| | | | 180/69.21 |
| 2013/0227818 A1* | 9/2013 | Zippert | B60R 21/38 |
| | | | 16/366 |
| 2014/0182962 A1 | 7/2014 | McIntyre, I et al. | |
| 2016/0339963 A1* | 11/2016 | Inoue | B62D 25/12 |
| 2019/0375369 A1* | 12/2019 | Hufen | E05D 3/06 |

FOREIGN PATENT DOCUMENTS

| | | |
|---|---|---|
| CN | 104165008 A | 11/2014 |
| CN | 1558982 A | 12/2014 |
| CN | 204370955 U | 6/2015 |
| CN | 102582568 B | 12/2015 |
| CN | 105270318 A | 1/2016 |
| CN | 105683473 A | 6/2016 |
| DE | 10 2011 075 267 A1 | 11/2012 |
| DE | 10 2014 222 889 A1 | 5/2016 |
| DE | 102007033325 B4 | 5/2016 |
| FR | 2865451 A1 | 7/2005 |
| JP | 2004203379 A | 7/2004 |
| KR | 10-1608613 B1 | 4/2016 |
| KR | 10-1619666 B1 | 5/2016 |

OTHER PUBLICATIONS

German-language Written Opinion (PCT/ISA/237) issued in PCT Application No. PCT/EP2017/070869 dated Oct. 30, 2017 (seven (7) pages).
German Search Report issued in counterpart German Application No. 10 2016 215 377.3 dated May 18, 2017 with partial English translation (12 pages).
Chinese Office Action in corresponding Application No. 201780031378.X dated Jun. 30, 2020 in English only (3 pages).

* cited by examiner

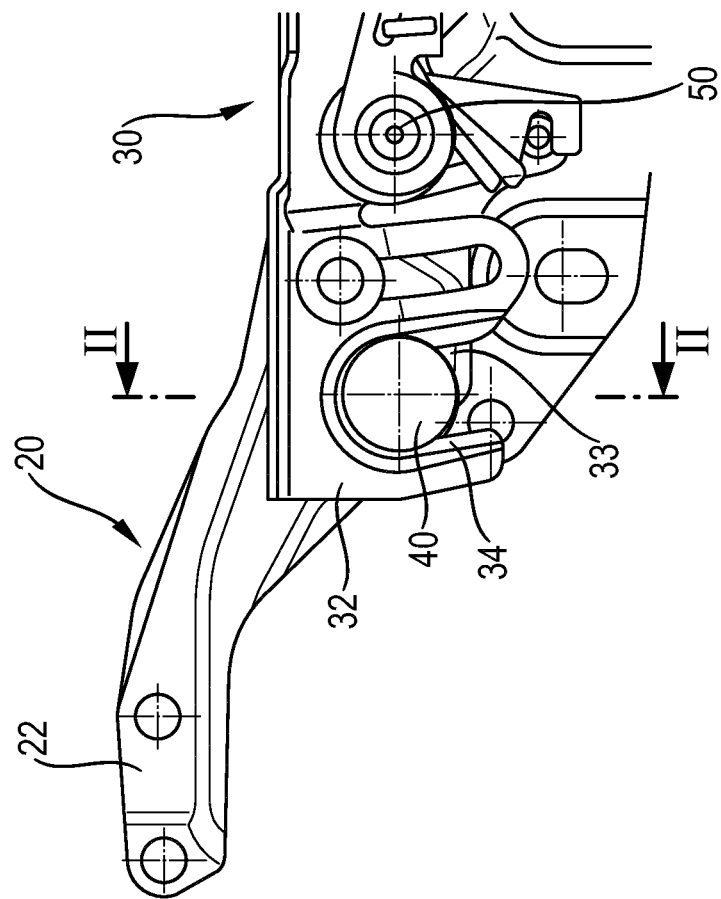
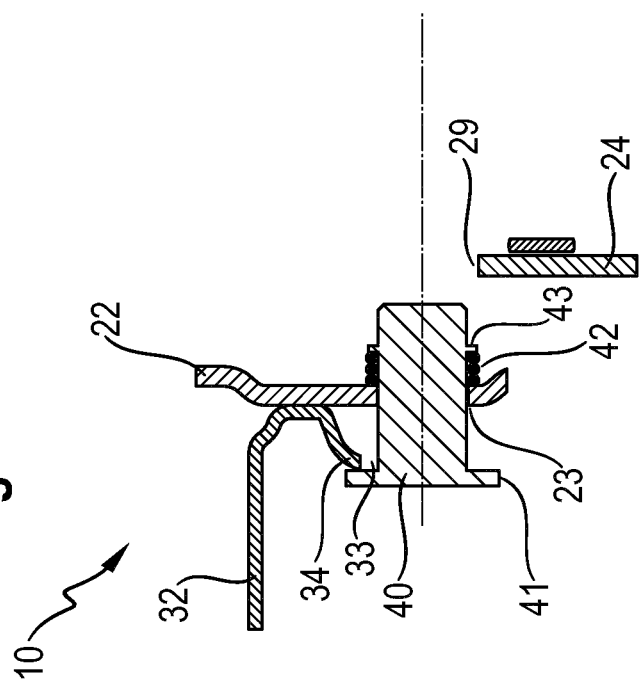

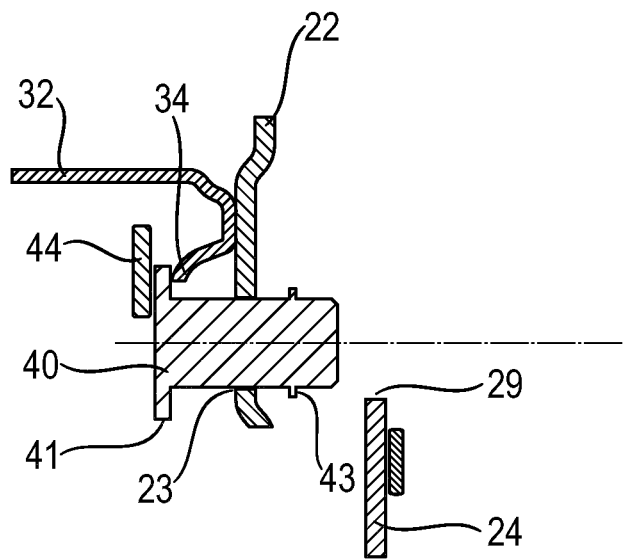
Fig. 5
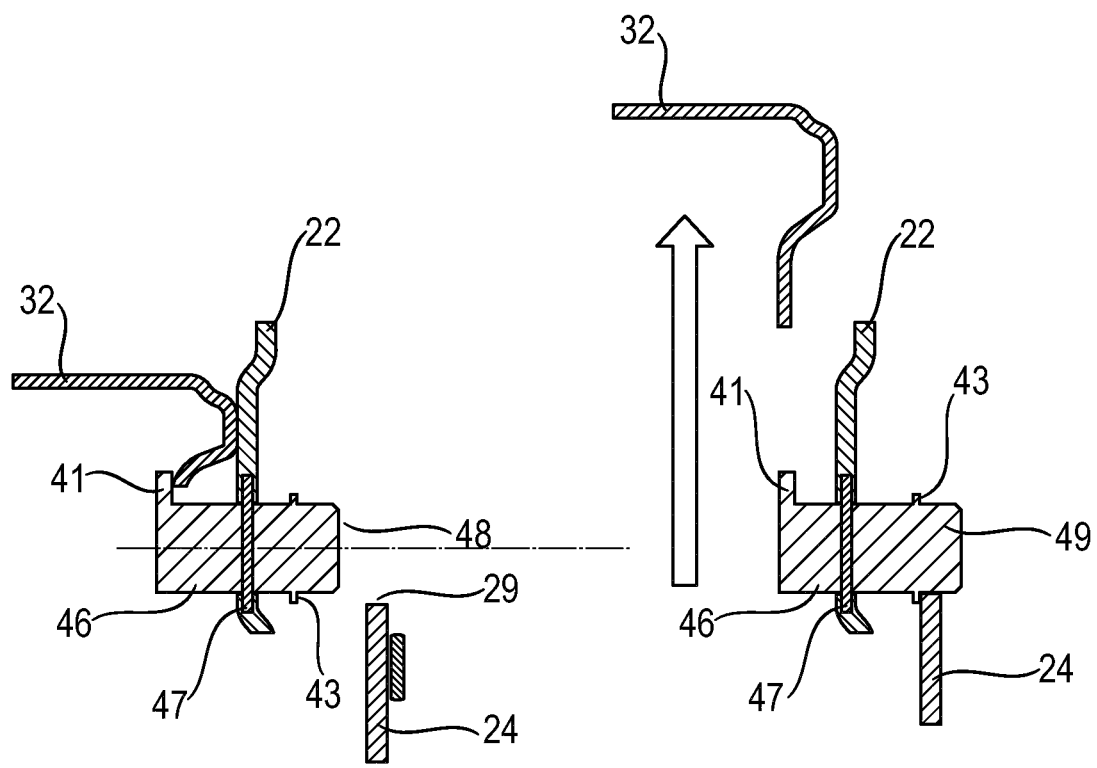
Fig. 6
Fig. 7

HINGE ASSEMBLY

CROSS REFERENCE TO RELATED APPLICATIONS

This application is a continuation of PCT International Application No. PCT/EP2017/070869, filed Aug. 17, 2017, which claims priority under 35 U.S.C. § 119 from German Patent Application No. 10 2016 215 377.3, filed Aug. 17, 2016, the entire disclosures of which are herein expressly incorporated by reference.

BACKGROUND AND SUMMARY OF THE INVENTION

The present invention relates to a hinge assembly for fastening a hinged cover on a vehicle body.

"Active pedestrian protection" for protecting pedestrians in the event of collisions with motor vehicles is becoming increasingly important in the development of modern motor-vehicle models. One aspect here involves a hinged cover, frequently the hood (also referred to as "engine hood"), having to be opened up to a certain height when a collision sensor—arranged for example in the bumper—of the vehicle registers a collision with a pedestrian, so that the pedestrian involved in this accident sustains the smallest possible amount of injury.

In the case of so-called "active" deployment of a relevant hinge, the hinge is actuated, for example, by way of an actuator using a propellant charge, in order for it to be possible for the hinge to be deployed quickly enough for the pedestrian to be protected to the intended extent by virtue of the hinged cover opening quickly. It is usually the case here that the actuator raises first of all that part of the hinge which is connected to the body—and frequently comprises a four-joint mechanism—and only then does it raise that part of the hinge which is connected to the hinged cover, following corresponding separation of the two hinge parts from one another, or once the hinge parts have been unlatched from one another.

In order to secure the deployed height, it is for example known for a deployed upper hinge part, which is connected to a hinged cover, to be locked in the deployed position by way of a spring-loaded bolt. Said height on the lower hinge part, however, is merely assisted by the cooperation of a pneumatic spring, but cannot be ensured in mechanical terms by the known technology.

In order to improve the safety further in this respect, it is therefore necessary not just to lock the deployed upper hinge part in the deployed position, but to provide additional measures so that it is also possible for the lower hinge part—including, in the case of a four-joint hinge, for example the main link and the long link—to be locked in the deployed position, without this additional safeguard having an adverse effect on the "normal" hinged-cover operation—i.e. the customary opening and closing operations of the hinged cover in the absence of any collision.

It is therefore an object of the present invention to provide an improved hinge assembly which meets more stringent safety requirements and provides for separate mechanical locking of the lower hinge part, without this adversely affecting the normal hinged-cover operation serving, for example, for maintenance purposes.

This object is achieved by a hinge assembly in accordance with embodiments of the invention.

According to the invention, a hinge assembly has: a first hinge part, which can be moved between a closed position and an open position and is intended for fastening on a vehicle body, a second hinge part, which can be moved between a closed position and an open position and is intended for fastening on a hinged-cover element which can be opened up relative to the vehicle body, and a deployment-securing device for locking the second hinge part relative to the first hinge part, wherein the deployment-securing device has a first securing part, which is assigned to the first hinge part, a second securing part, which is assigned to the second hinge part, and a locking element. The deployment-securing device is designed such that, in the closed position, the locking element is coupled to the first securing part and is locked in a first locking position by the second securing part and, during its movement from the closed position into the open position, the second securing part releases the locking action of the locking element and thus frees the locking element. The hinge assembly according to the invention is distinguished in that the deployment-securing device is configured such that, following the release of the locking action in the first locking position, the locking element is moved into a second locking position, in which it establishes coupling between the first securing part and a third securing part, which is assigned to the first hinge part, and locks said securing parts in the open position.

It should be noted that, for the purposes of the description of the present invention, it is assumed that the closed position is that position of the hinge assembly, and of the hinged cover connected thereto, is that which prevails during normal operation of a motor vehicle in traffic. The open position, in contrast, is that position of the hinge assembly, and of the hinged cover connected thereto, which arises in the event of a collision with a pedestrian, as a result of the hinged cover opening by means of the actuator in order to improve pedestrian protection. Accordingly, "movement from the closed position into the open position" is to be understood to mean that movement which results in the open position defined above. In other words, the "movement from the closed position into the open position" is not intended to mean the "normal" opening movement of the hinged cover into a "normal" open position, as is performed for example for carrying out maintenance work; rather, it is intended to mean the action of the hinged cover "shooting upwards" as a result of the propellant charge of the actuator. As a result, it is also the case that the first hinge part of the hinged cover is mechanically secured or locked.

According to the invention, the assembly is therefore such that, during "normal" opening of the hinged cover, the locking action which is established between the first securing part and the second securing part by the deployment-securing device is maintained, whereas said locking action is released precisely when the second securing part is moved from the closed position into the open position by the actuator and frees the locking element. Therefore, this locking action, in the first locking position, does not obstruct the normal operation of the hinged cover. Since it is only during active movement of the second securing part that the locking action is automatically released by the active actuator-induced movement of the second securing part, and then the locking element establishes a locking action between the first securing part and the third securing part, said parts therefore being locked in the open position, the locking action of the first hinge part in the open position only comes into effect when active deployment of the hinge actually takes place. This makes it possible to meet more stringent safety requirements.

The present invention can be used particularly advantageously if the first hinge part is designed in the form of a four-joint hinge. It is then preferably the case here that the first securing part of the first hinge part is part of a main link, and the third securing part of the first hinge part is part of a long link, of the four-joint hinge, and the second securing part of the second hinge part is part of an upper hinge part assigned to the four-joint hinge.

According to one embodiment, the locking element is a locking bolt, which is forced in the direction of the second locking position by means of a spring. This embodiment can be produced straightforwardly in design terms and, at the same time, functions very reliably. According to an alternative embodiment, the locking element is a rotatably mounted catch, which is forced in the direction of the second locking position by means of a spring. It is also the case that this technical configuration has a high level of functional reliability and can likewise be produced cost-effectively.

A particularly straightforward and, at the same time, reliable configuration of the present invention is achieved if the aforementioned spring is a helical spring or a leafspring.

According to a further embodiment, the first securing part and the third securing part are configured such that they have respective through-holes, in which the locking element can engage in the second locking position or which said locking element can pass through.

According to another embodiment, the second securing part has a stop end for abutment against a stop flange of the locking element in the first locking position. This ensures that the first locking position is maintained particularly straightforwardly.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a side view of a first embodiment of the hinge assembly according to the invention in a first locking position.

FIG. 2 is a sectional view of this first embodiment taken along line II-II from FIG. 1.

FIG. 5 is a sectional view similar to FIGS. 2 and 4, this time of a second embodiment of the hinge assembly according to the invention in the first locking position.

FIG. 6 is a sectional view similar to FIGS. 2 and 4, this time of a third embodiment of the hinge assembly according to the invention in the first locking position.

FIG. 7 is a sectional view similar to FIGS. 2 and 4, this time showing the third embodiment of the hinge assembly according to the invention in the second locking position.

DETAILED DESCRIPTION OF THE DRAWINGS

Figure 3:
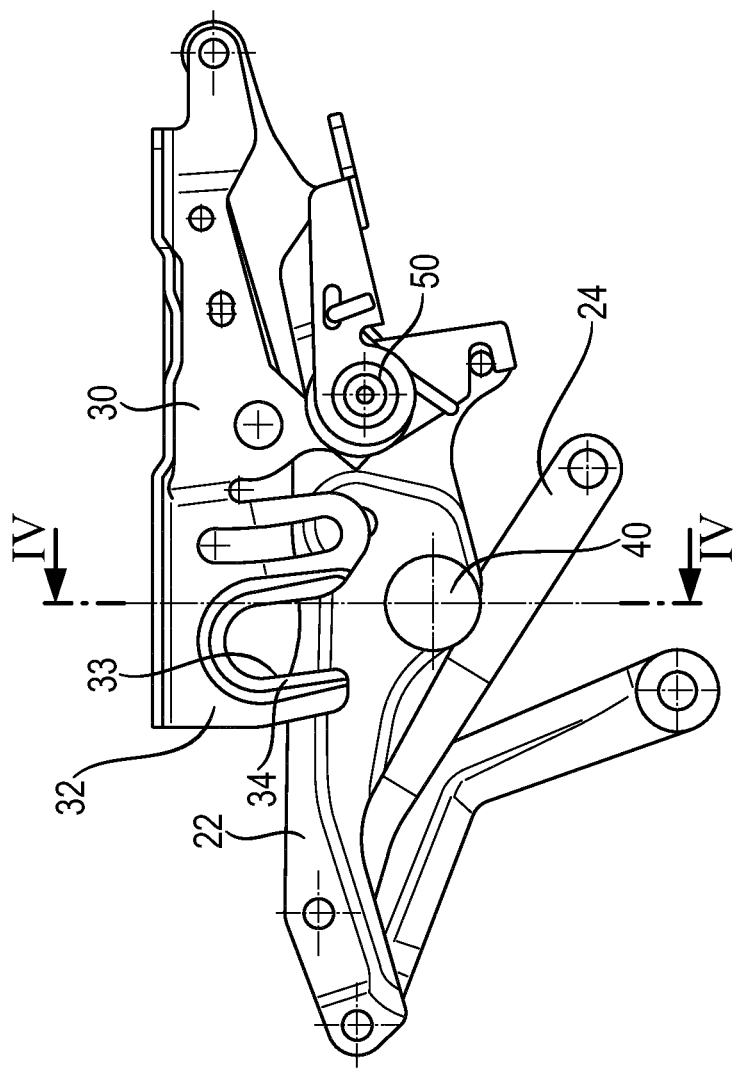
FIG. 3 is a side view of the first embodiment of the hinge assembly according to the invention in a second locking position.

The present invention is described hereinbelow on the basis that the first hinge part is a four-joint hinge, although of course the invention is not restricted thereto. In order to facilitate further explanation, it is assumed, for the sake of simplicity, that a hinge assembly according to the invention is used for fastening a hood of a motor vehicle and is illustrated in the figures more or less as it is arranged on a motor vehicle which is ready for use and is located on a planar surface. It is therefore the case here that the vehicle body is arranged at the "bottom", whereas the hinged cover/hood is located at the "top". Therefore, "bottom" and "top" refer to the hinge assembly, irrespective of how this is, or can be, arranged in precise terms in space. Information such as "right(-hand)" and "left(-hand)" refer to a vertical view of the drawing plane.

FIG. 1 shows a side view of a first embodiment of the hinge assembly 10 according to the invention, and FIG. 2 illustrates a sectional view of this first embodiment taken along line II-II from FIG. 1. The left-hand upper part of FIG. 1 illustrates, in the foreground, a first securing part 22 in the form of a main link and, behind this, a third securing part 24 (see FIG. 2) in the form of a long link of a four-joint hinge 20 or of a first hinge part. This four-joint hinge 20 typically has its lower region fastened on the body of a motor vehicle. The right-hand part of FIG. 1 illustrates, in the foreground, a second hinge part 30 in the form of an upper hinge part, which is fastened to the hood of the motor vehicle and is articulated on the four-joint hinge 20 by means of a connecting joint 50. FIG. 1 shows—as does FIG. 2—the four-joint hinge 20 and the upper hinge part 30 in a first locking position, corresponding to a position of the two hinge parts when the motor vehicle is in normal use.

As is clear, in particular looking further at FIG. 2, a locking action in the first locking position is caused by a bolt 40 establishing a mechanical coupling between the upper hinge part 30—or, more precisely, the end 32 thereof, which is located on the left in FIG. 1 and serves as a second securing part—and the main link 22. For this purpose, the bolt 40 passes through a downwardly open slot 33 of the second securing part 32 and a through-hole 23 of the main link 22. A reliable mechanical locking action between these two elements is ensured in that a helical spring 42, supported on a stop flange 43 of the bolt 40 on the one hand and on the main link 22 on the other, forces the bolt 40 to the right in FIG. 2, wherein the stop flange 41, which is provided at the left-hand end of the bolt 40, butts against a stop end 34 of the upper hinge part 30 and prevents the bolt 40 from moving to the right. Therefore, the main link 22, the long link 24, the bolt 40, the helical spring 42 arranged thereon and the upper hinge part 32 form a deployment-securing device.

Figure 4:
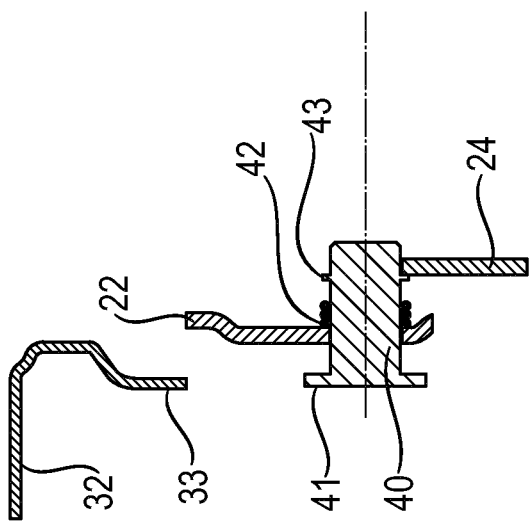
FIG. 4 is a sectional view of this first embodiment taken along line IV-IV from FIG. 3.

As soon as, in the event of the vehicle equipped with the hinge assembly 10 according to the invention colliding with a pedestrian, the upper hinge part 30 is "shot" upward by an actuator, the slot 33 of the upper hinge part 30 is moved upward to such an extent that the bolt 40 disengages from the slot 33 and therefore no longer has its stop flange 41 butting against the stop end 34 of the upper hinge part 30. This position is shown in FIGS. 3 and 4. The pressure of the helical spring 42 then moves the bolt 40 to the right, until it has its stop flange 41 in abutment against the main link 22 and its right-hand end butting against an associated abutment surface 29 of the long link 24. In this position, which constitutes a second locking position, the bolt 40 therefore establishes a fixing or locking action of the long link 24 and of the main link 22 relative to one another. Moreover, the fixed articulation of the upper hinge part 30 on the main link 22 by means of the connecting joint 50, in this second locking position, ensures that it is not just the main link 22 and the long link 24, and therefore the four-joint hinge 20 as a whole, but also the upper hinge part 30 which is locked firmly in the second locking position. It is therefore possible, in the event of the vehicle colliding with a pedestrian, to ensure with a maximum level of certainty that the opened-up hinged cover or hood remains in the open state and therefore performs the function necessary for the active pedestrian protection.

FIG. 5 shows a second embodiment of the hinge assembly 10 according to the invention in the first locking position. This second embodiment differs from the first embodiment in so far as there is no helical spring 42, supported on the main link 22 of the four-joint hinge 20 and on a stop flange 43 of the bolt 40, provided in order to force the bolt 40 into the second locking position. The helical spring 42 is replaced by a leafspring 44 (illustrated only schematically), which acts on the left-hand side of the stop flange 41 of the bolt 40 in order to push or to force the latter in the direction of the second locking position. The functioning of this second embodiment in respect of the movements of the upper hinge part 30 and of the bolt 40 is the same as that of the first embodiment, and so, for reasons of conciseness, there will not be a renewed description given here. Therefore, the main link 22, the long link 24, the bolt 40, the leafspring 44 arranged thereon and the upper hinge part 32 form a deployment-securing device.

FIGS. 6 and 7 show a third embodiment of the hinge assembly 10 according to the invention in the first locking position. In contrast to the first and second embodiments, the third embodiment has the bolt 40 replaced by a rotatably mounted catch 46, which is forced in the direction of the second locking position and can be pivoted about a vertical axis of rotation 47, which is anchored in the main link 22 and in this embodiment runs in the drawing plane. It is also the case that the catch 46 has, at the top left, a stop flange 41, which in the first locking position butts against a corresponding stop end 34 of the upper hinge part 30. An engagement portion 49, which extends into the drawing plane, but cannot be seen in FIG. 6, is provided at the right-hand end 48 of the catch 46, said right-hand end being visible in FIG. 6. As soon as the stop end 34 of the upper hinge part 30 is shot upward in the event of a collision, which is indicated schematically by the upwardly directed arrow illustrated on the left, the stop end 41 of the catch 46 disengages from the stop end 34 and the catch 46—which is forced in the direction of the second locking position for example by a helical spring (not illustrated here)—rotates about the axis of rotation 47 until the engagement portion 49 acts on, or butts against, an abutment surface 29 of the long link 24, as can be seen from FIG. 7. It is therefore also the case with this third embodiment, in a manner similar to the first two embodiments, that a locking action is established between the main link 22 and the long link 24 in the second locking position. Therefore, the main link 22, the long link 24, the catch 46, the helical spring (not depicted) and the upper hinge part 32 form a deployment-securing means.

It should be noted that those features of the invention which are described with reference to individual embodiments or variants, for example the type and configuration of the locking element, of the individual hinge part and securing parts and of the deployment-securing means, may also be present in other embodiments, unless indicated to the contrary or ruled out for technical reasons. As far as such features described in combination for individual embodiments are concerned, moreover, it is not necessarily always the case that all the features have to be realized in a relevant embodiment.

LIST OF REFERENCE SIGNS

10 Hinge assembly
20 First hinge part/four-joint hinge
22 First securing part/main link
23 Through-hole
24 Third securing part/long link
29 Abutment surface
30 Second hinge part/upper hinge part
32 Second securing part
33 Slot
34 Stop end
40 Bolt
41 Stop flange
42 Helical spring
43 Stop flange
44 Leafspring
46 Catch
47 Axis of rotation
48 Right-hand end
49 Engagement portion
50 Connecting joint The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hinge assembly for fastening a hinged cover on a vehicle body, comprising:
   a first hinge part, which is movable between a closed position and an open position and is intended for fastening on a vehicle body;
   a second hinge part, which is movable between a closed position and an open position and is intended for fastening on a hinged-cover element which is openable relative to the vehicle body;
   wherein the second hinge part is rotatable relative to the first hinge part about a hinge axis; and
   a deployment-securing device for locking the second hinge part relative to the first hinge part,
   wherein the deployment-securing device comprises a first securing part, which is assigned to the first hinge part, a second securing part, which is assigned to the second hinge part, and a locking element, and is configured such that:
   (i) in the closed position, the locking element is coupled to the first securing part and is locked in a first locking position by the second securing part,
   (ii) during movement from the closed position into the open position, the second securing part releases a locking action of the locking element and frees the locking element, and
   (iii) following the release of the locking action in the first locking position, the locking element is moved by a spring along an axial direction parallel to the hinge axis into a second locking position, in which the locking element establishes coupling between the first securing part and a third securing part, which is assigned to the first hinge part, and locks said securing parts in the open position.

2. The hinge assembly as claimed in claim 1, wherein the first securing part of the first hinge part is part of a main link, and the third securing part of the first hinge part is part of a long link, of a four-joint hinge, and the second securing part of the second hinge part is part of an upper hinge part assigned to the four-joint hinge.

3. The hinge assembly as claimed in claim 1, wherein the locking element is a locking bolt.

4. The hinge assembly as claimed in claim 1, wherein the locking element is a rotatably mounted catch, which is forced in the direction of the second locking position by the spring.

5. The hinge assembly as claimed in claim 4, wherein the spring is a helical spring or a leafspring.

6. The hinge assembly as claimed in claim 1, wherein
the first securing part has a through-hole for the through-engagement of the locking element, and
the third securing part has an abutment surface for abutment against the locking element.

7. The hinge assembly as claimed in claim 6, wherein
the second securing part has a stop end for abutment against a stop flange of the locking element in the first locking position.

8. The hinge assembly as claimed in claim 3, wherein the spring is a helical spring or a leafspring.

9. The hinge assembly as claimed in claim 1, wherein
the second securing part has a stop end for abutment against a stop flange of the locking element in the first locking position.

* * * * *